W. B. GREENE.
OPHTHALMIC MOUNTING.
APPLICATION FILED APR. 12, 1919.
1,306,535.
Patented June 10, 1919.
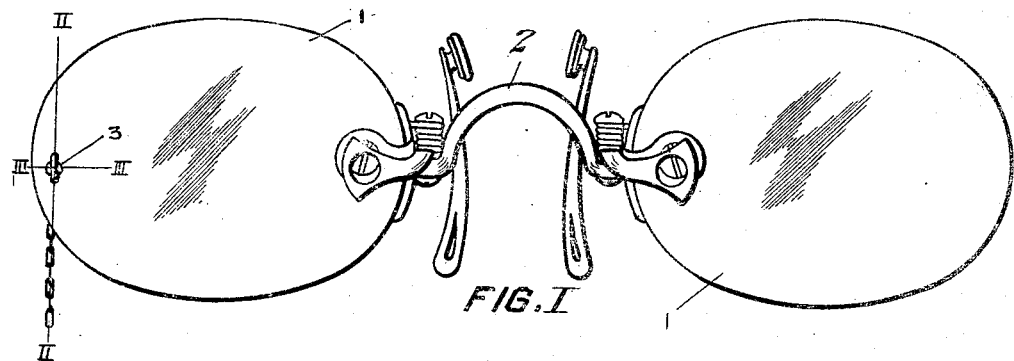
FIG. I
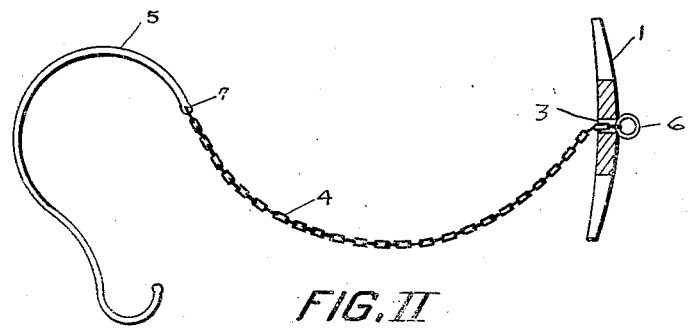
FIG. II
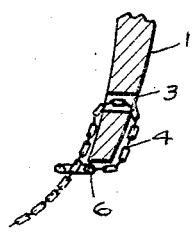
FIG. III
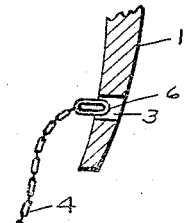
FIG. IV
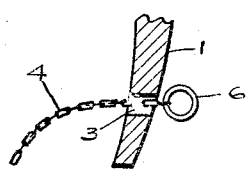
FIG. V
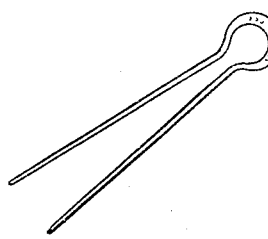
INVENTOR
WILLARD B. GREENE
BY
*H. H. Styll & H. K. Parsons*
ATTORNEYS

UNITED STATES PATENT OFFICE.

WILLARD B. GREENE, OF BOSTON, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,306,535.  Specification of Letters Patent.  Patented June 10, 1919.

Application filed April 12, 1919. Serial No. 289,564.

*To all whom it may concern:*

Be it known that I, WILLARD B. GREENE, a citizen of the United States, residing at Boston, in the county of Suffolk and State of Massachusetts, have invented certain new and useful Improvements in Ophthalmic Mountings, of which the following is a specification.

This invention relates to improvements in ophthalmic mountings and has particular reference to a readily attachable chain or holding device for preventing dropping or breakage of the mounting.

One of the leading objects of the present invention is the provision of a novel and improved device of this character which may be readily applied to an eyeglass mounting, and which will eliminate all projecting hooks, catches or the like which are liable to catch in either the clothing or hair, in the case of a lady, or in a handkerchief or cloth when wiping the lenses.

A further object of the present invention is the provision of an improved device of this character which may be either simply threaded through the lens and allowed to remain loosely in place, or which may be secured to the lens, according to the individual preference of the wearer and without any variance in the structural features of the device.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting equipped with my improvement.

Fig. II represents a sectional view through the lens as on the line II—II of Fig. I, showing one manner of applying my device to the lens.

Fig. III represents a sectional view as on the line III—III of Fig. I, illustrating the device applied to the lens in a different manner.

Fig. IV represents a view of a hair-pin construction showing the attachment of the parts.

Fig. V is a view showing the parts in assembled relation.

In the drawings, the numeral 1 designates the lenses, which may be connected by the usual center or mounting 2, one of the lenses being provided near its outer edge with the aperture 3, adapted to receive my improved device for preventing loss of the mounting. This device in its preferred form comprises the chain or flexible connecting member 4 bearing at one end the ear hook 5 and bearing at the opposite end the small ring 6.

It will be particularly noted by reference to Fig. II that the diameters of the chain 4 and of the ear loop 5 and of the eye 7 by which the parts 4 and 5 are connected, are all less than the diameter of the aperture 3 in the lens, so that the ear hook may be threaded through this aperture as a needle and the chain drawn on through as a thread in the eye of the needle. On the other hand, however, the outside diameter of the ring 6, it will be noted, is greater than the diameter of the aperture 3, so that the ring 6 may be drawn against the front face of the lens and prevent disengagement of the parts, as when the mounting slips from the nose, for example, when it will hang by the chain 4, thus preventing dropping on the floor and breakage. I would call particular attention, however, to the fact that while the outside diameter of the ring 6 is greater than that of the aperture 3, the inside diameter or diameter of the open space inclosed by the ring is substantially the same as that of the aperture 3, so that if preferred in place of leaving the ring bearing against the front face of the lens the ear loop 5 and chain 4 may be looped around the edge of the lens and threaded through the ring 6 to, as it were, tie the chain around the lens or hold it by a slip-noose connection, as clearly illustrated in connection with Fig. III. The advantage of this construction resides in the fact that while the parts in Fig. II are entirely satisfactory so far as wear is concerned, there is a possibility of the ring 6 slipping forward away from the lens and of the chain getting tangled up on this account, if the parts are carried around in a case or the like for any considerable period, while by the application of the device as shown in Fig. III this loosening up of the parts is practically entirely eliminated and the chain securely held in place against accidental loosening, while at the same time all catches or the like such as ordinarily employed, are eliminated and thus parts to catch on either the clothing, hair or handkerchief done away with.

I would also call attention to the fact that the interior diameter of the rim 6 has a slight binding action against the chain 4 so the parts have what might be termed a tight sliding fit, thus serving to frictionally resist any loosening of the loop formed around the end of the lens by the chain.

An additional advantage of my present construction resides in the fact that while the ring 6 when bearing merely against the front of the lens is preferably left in its rounded form so that if desired when put in the form shown in Fig. III it may be flattened by pliers to fit onto the chain and firmly secure the loop in place, it is capable of ready adjustment by crimping with pliers to restore the ring to its initial rounded form.

A further advantage attained by the use of the ring at the end of the chain abutting the front face of the rim will be understood by reference to Figs. IV and V, showing a hair-pin type of construction, from which it will be seen that in these forms in the event the hair-pin is of size that could not be threaded through the aperture in the lens with chain attached, it is possible to have the ring initially flattened or rendered oval in form so it will thread through the aperture of the lens, as shown in Fig. IV, and after it has been so threaded it may be expanded into circular form, when it will bear against the face of the lens, as shown in Fig. II, and prevent disengagement of the parts.

I claim:

1. A retaining device for an ophthalmic mounting, including an attaching member, a flexible connection carried thereby, and a ring of slightly larger diameter than the connection secured to the forward end thereof.

2. A retaining device for an ophthalmic mounting, including a flexible connection, an attachment for the rear end thereof, and a retaining ring of greater diameter than the connection carried by the forward end of the connection.

3. The combination with an ophthalmic lens having an aperture drilled therethrough, of a flexible connection adapted to be threaded through the aperture, and a retaining ring carried by one end of the connection and having its exterior diameter slightly greater than the diameter of the aperture to prevent drawing of the ring through the aperture.

4. The combination with an ophthalmic lens having an aperture drilled therethrough, of a flexible connection adapted to be threaded through the aperture, a retaining ring carried by one end of the connection and having its exterior diameter slightly greater than the diameter of the aperture to prevent drawing of the ring through the aperture, and a securing member on the other end of the flexible connection of less maximum diameter than the diameter of the aperture, whereby the securing member may be threaded into place through the aperture.

5. The combination with an ophthalmic lens having an aperture drilled therethrough, of a flexible connection adapted to be threaded through the aperture, a retaining ring carried by one end of the connection and having its exterior diameter slightly greater than the diameter of the aperture to prevent drawing of the ring through the aperture, and a securing member on the other end of the flexible connection of less maximum diameter than the diameter of the aperture, the interior diameter of the ring on the flexible connection being substantially that of the aperture in the lens, whereby the retaining member and flexible connection may be threaded in place through the aperture in the lens and their movement limited through engagement between the ring and lens, and the said parts can then be looped around the end of the lens and threaded through the aperture in the ring to securely lock them in position, substantially as illustrated.

6. A retaining device for ophthalmic mountings or the like, including an attaching member, a flexible connection carried thereby, and a closed ring secured at the end of the connection and of greater diameter than the two first named parts, whereby said parts may be threaded through the ring to form a loop in the connection, substantially as and for the purpose described.

In testimony whereof I have affixed my signature, in presence of two witnesses.

WILLARD B. GREENE.

Witnesses:
DENNIS T. CRAWLEY,
GEORGE A. NUGENT.